(12) United States Patent
Ogiso et al.

(10) Patent No.: US 11,712,985 B2
(45) Date of Patent: Aug. 1, 2023

(54) AIR BAG AND VEHICLE SEAT DEVICE

(71) Applicant: AISIN CORPORATION, Kariya (JP)

(72) Inventors: Takashi Ogiso, Kariya (JP); Tomoko Kanbara, Kariya (JP); Satoshi Masuda, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/655,814

(22) Filed: Mar. 22, 2022

(65) Prior Publication Data

US 2022/0314852 A1     Oct. 6, 2022

(30) Foreign Application Priority Data

Apr. 2, 2021   (JP) ................. 2021-063614

(51) Int. Cl.
| | |
|---|---|
| *B60N 2/66* | (2006.01) |
| *B60N 2/90* | (2018.01) |
| *A47C 7/46* | (2006.01) |

(52) U.S. Cl.
CPC .............. *B60N 2/665* (2015.04); *A47C 7/467* (2013.01); *B60N 2/914* (2018.02); *B60N 2/976* (2018.02)

(58) Field of Classification Search
CPC ........ B60N 2/914; B60N 2/976; B60N 2/665; A47C 7/467
See application file for complete search history.

(56) References Cited

U.S. PATENT DOCUMENTS

| | | | | |
|---|---|---|---|---|
| 5,658,050 A | * | 8/1997 | Lorbiecki | ............... B62J 1/12 297/284.6 |
| 2021/0078475 A1 | | 3/2021 | Kurematsu et al. | |

FOREIGN PATENT DOCUMENTS

| | | |
|---|---|---|
| JP | 2016-216003 A | 12/2016 |
| JP | 2018-095015 A | 6/2018 |
| JP | 2021-045280 A | 3/2021 |

* cited by examiner

*Primary Examiner* — Syed A Islam
(74) *Attorney, Agent, or Firm* — Oblon, McClelland, Maier & Neustadt, L.L.P.

(57) ABSTRACT

An air bag includes a bag portion formed by bonding two sheet members together. The bag portion includes an expansion portion including an annular joining portion extending in an annular shape, and a passage portion including a pair of parallel linear joining portions and connected to the expansion portion. Air filled in the bag portion flows through an internal space of the expansion portion surrounded by the annular joining portion and a passage sandwiched between the linear joining portions defining the passage portion. At a connection portion between the expansion portion and the passage portion, the linear joining portions extend in parallel, or the linear joining portions extend so as to expand toward a deep side of the passage from an opening position of the passage with respect to the internal space of the expansion portion.

6 Claims, 8 Drawing Sheets

AIR BAG AND VEHICLE SEAT DEVICE

CROSS REFERENCE TO RELATED APPLICATIONS

This application is based on and claims priority under 35 U.S.C. § 119 to Japanese Patent Application 2021-063614, filed on Apr. 2, 2021, the entire content of which is incorporated herein by reference.

TECHNICAL FIELD

This disclosure relates to an air bag and a vehicle seat device.

BACKGROUND DISCUSSION

In the related art, there is an air bag including a bag portion formed by bonding two sheet members together. For example, JP 2018-95015A (Reference 1) discloses a configuration in which a plurality of bag portions are overlapped in a thickness direction of a sheet member, and when an air bag is expanded by filling air, a large stroke amount is secured in a direction in which the sheet members are overlapped. Further, an air bag described in JP 2016-216003A (Reference 2) includes a bag portion including a plurality of expansion portions and a passage portion that connects each of these expansion portions. Further, in this air bag, the plurality of expansion portions are arranged in an overlapping manner by bending the passage portion. Accordingly, the large stroke amount can be secured with a simple configuration.

However, as described above, in the configuration including the passage portion connected to the expansion portions, when the bag portion is filled with air, the expansion portions and the connection portions between the expansion portions and the passage portion are expanded, and thus there is a problem in that the expanded shape is likely to deform.

SUMMARY

According to an aspect of this disclosure, an air bag includes a bag portion formed by bonding two sheet members together, the bag portion includes: an expansion portion which includes an annular joining portion extending in an annular shape, and a passage portion which includes a pair of parallel linear joining portions and is connected to the expansion portion, air filled in the bag portion flows through an internal space of the expansion portion surrounded by the annular joining portion and a passage sandwiched between the pair of linear joining portions defining the passage portion, and at a connection portion between the expansion portion and the passage portion, the pair of linear joining portions extend in parallel, or the pair of linear joining portions extend so as to expand toward a deep side of the passage from an opening position of the passage with respect to the internal space of the expansion portion.

In a vehicle seat device according to an aspect of this disclosure, the air bag according to the above aspect is disposed on an inner side of a seat cover of the vehicle seat device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of an air bag and a vehicle seat device will be described with reference to the drawings.

Figure 1:
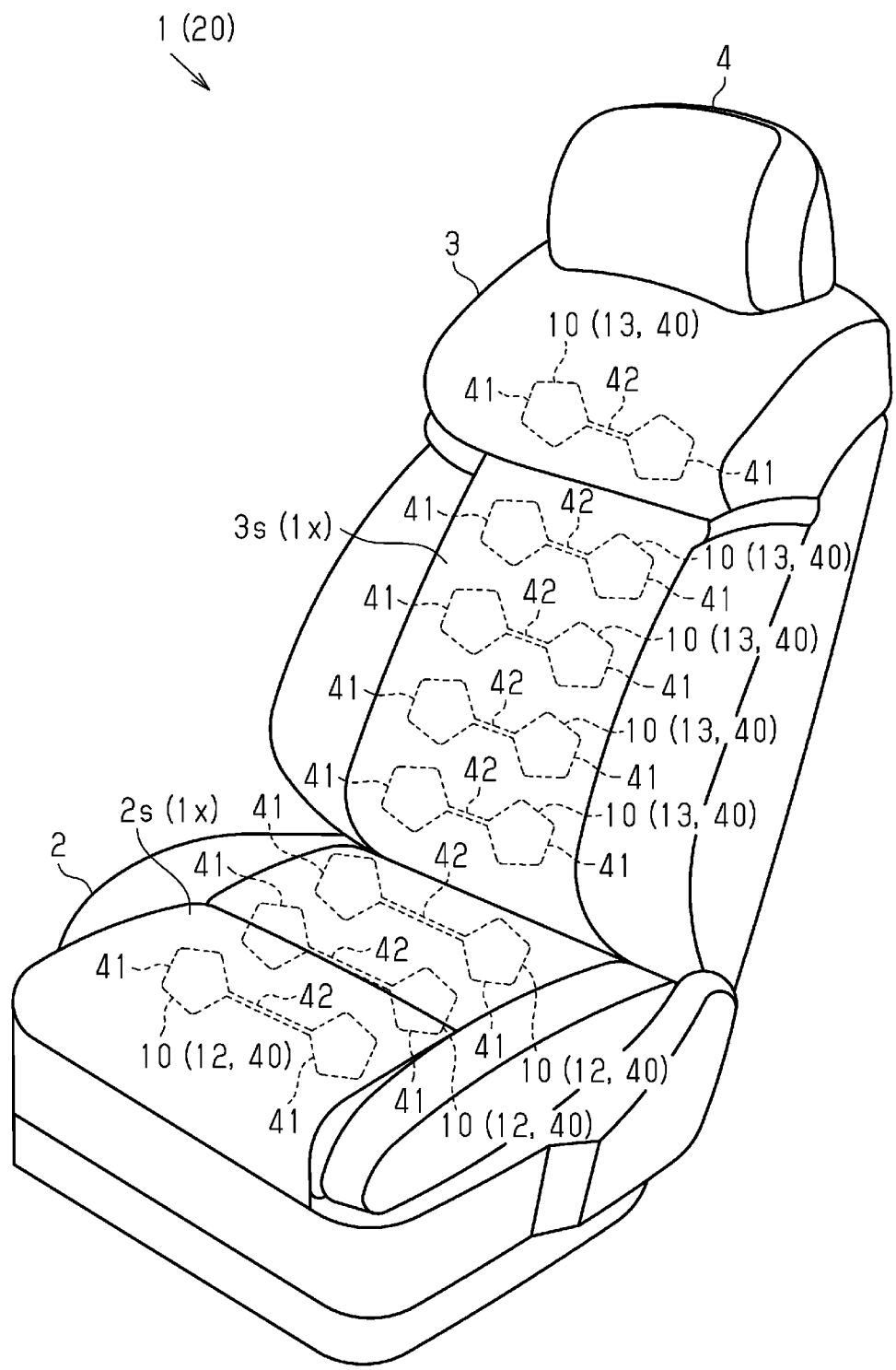
FIG. 1 is a perspective view of a vehicle seat provided with an air bag disposed on the inner side of a seat cover thereof.

As illustrated in FIG. 1, a vehicle seat 1 includes a seat cushion 2 and a seat back 3 provided at a rear end portion of the seat cushion 2. Further, the seat back 3 is provided with a headrest 4 at an upper end thereof.

Further, the seat 1 according to the present embodiment is provided with a plurality of air bags 10 which are expanded and contracted on the inner side of the seat cushion 2 and the seat back 3 to press a seat cover 1x including a seating surface 2s and a backrest surface 3s from the inner side. Specifically, the seat cushion 2 is provided with independent air bags 12 for the seat cushion 2 at positions corresponding to buttocks and thighs of an occupant seated on the seat 1. Further, the seat back 3 is also provided with independent air bags 13 for the seat back 3 at positions corresponding to shoulder and waist of the occupant leaning against the backrest surface 3s. Then, in the seat 1 according to the present embodiment, a vehicle seat device 20 is formed that is capable of imparting a refresh effect to the occupant seated on the seat 1 by expanding and contracting each of these air bags 10.

Figure 2:
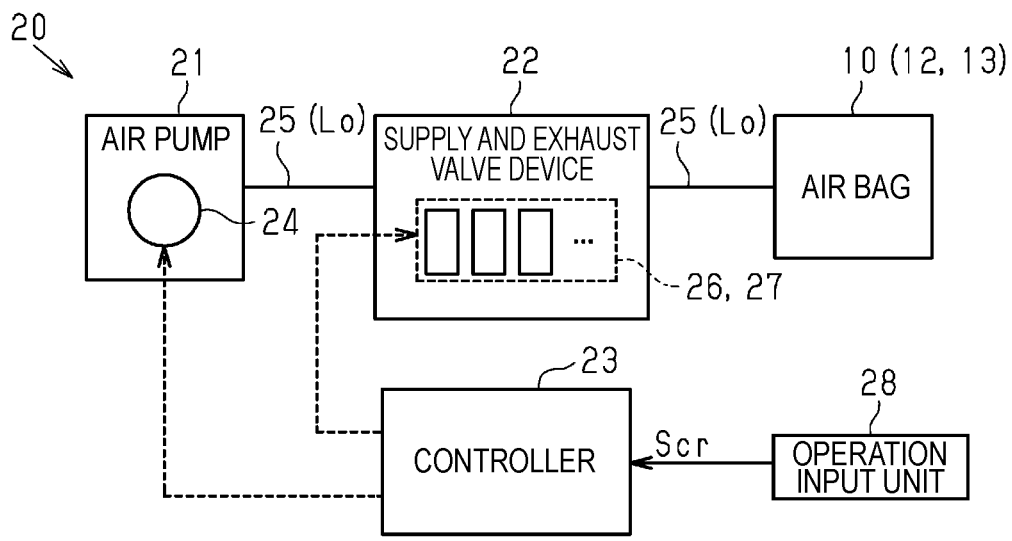
FIG. 2 is a schematic configuration diagram of a seat device.

Specifically, as illustrated in FIG. 2, the seat device 20 according to the present embodiment includes an air pump 21 that pumps air to each of the air bags 10 provided in the seat 1. Further, a supply and exhaust valve device 22 is interposed between the air pump 21 and the air bags 10. In the seat device 20 according to the present embodiment, operations of the air pump 21 and the supply and exhaust valve device 22 are controlled by a controller 23.

Specifically, an electric pump using a motor 24 as a drive source is used as the air pump 21 according to the present embodiment. Further, the supply and exhaust valve device 22 is connected to the air bags 10 and the air pump 21 via flexible resin air tubes 25. That is, in the seat device 20 according to the present embodiment, the air tubes 25 and an internal passage of the supply and exhaust valve device 22 form a passage of air, that is, an air supply and exhaust passage Lo, which communicates between each of the air bags 10 and the air pump 21. Accordingly, the air supply and exhaust valve device 22 according to the present embodiment is configured such that an air supply valve 26 and an air exhaust valve 27 are disposed in the middle of the air supply and exhaust passage Lo.

Further, an operation input signal Scr for an operation input unit 28 provided on the seat 1 is input to the controller 23 according to the present embodiment. The controller 23 according to the present embodiment is configured to control, based on an operation request indicated by the operation input signal Scr, the operations of the air pump 21 and the supply and exhaust valve device 22 in order to make each of the air bags 10 expand and contract.

Specifically, the controller 23 according to the present embodiment sequentially switches each of the air bags 10 in the expanded state based on a predetermined operation pattern corresponding to the operation input signal Scr received from the operation input unit 28. Accordingly, the seat device 20 according to the present embodiment is configured to intermittently expand and contract the air bags 10 such that the occupant seated on the seat 1 can obtain a desired refresh effect.

(Air Bag)

Next, a configuration of the air bag 10 used in the seat device 20 according to the present embodiment will be described.

Figure 3:
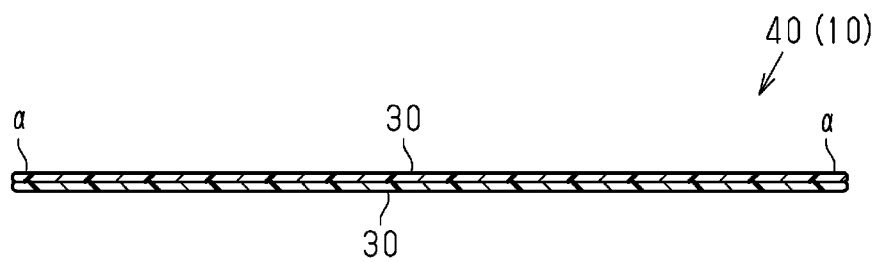
FIG. 3 is a cross-sectional view of the air bag that is not filled with air.
Figure 4:
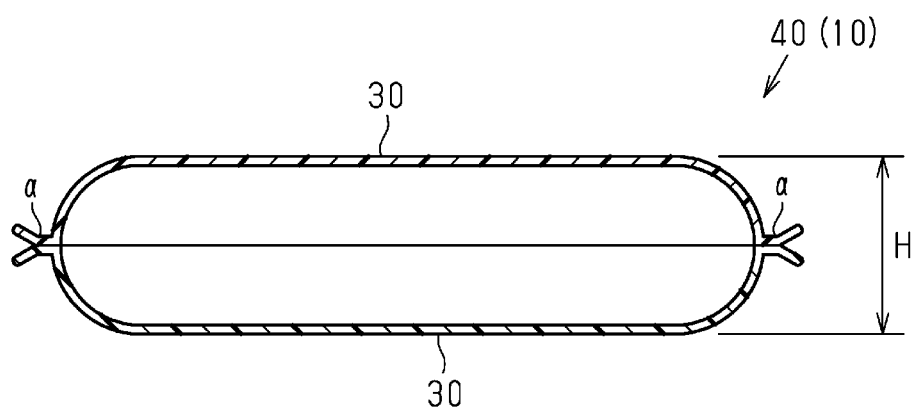
FIG. 4 is a cross-sectional view of the air bag filled with air.

As illustrated in FIGS. 3 and 4, in the seat device 20 according to the present embodiment, each of the air bags 10 has a bag portion 40 formed by bonding two sheet members 30, 30 together. That is, in each of the air bags 10 according to the present embodiment, air is filled between the two sheet members 30, 30 which includes a joining portion $\alpha$ extending over the entire peripheral edge portion thereof and are bonded to each other, and thus the bag portion 40 surrounded by the joining portion $\alpha$ is expanded. The expanded bag portion 40 is configured to press the seat cover 1$x$ from the inner side.

Figure 5:
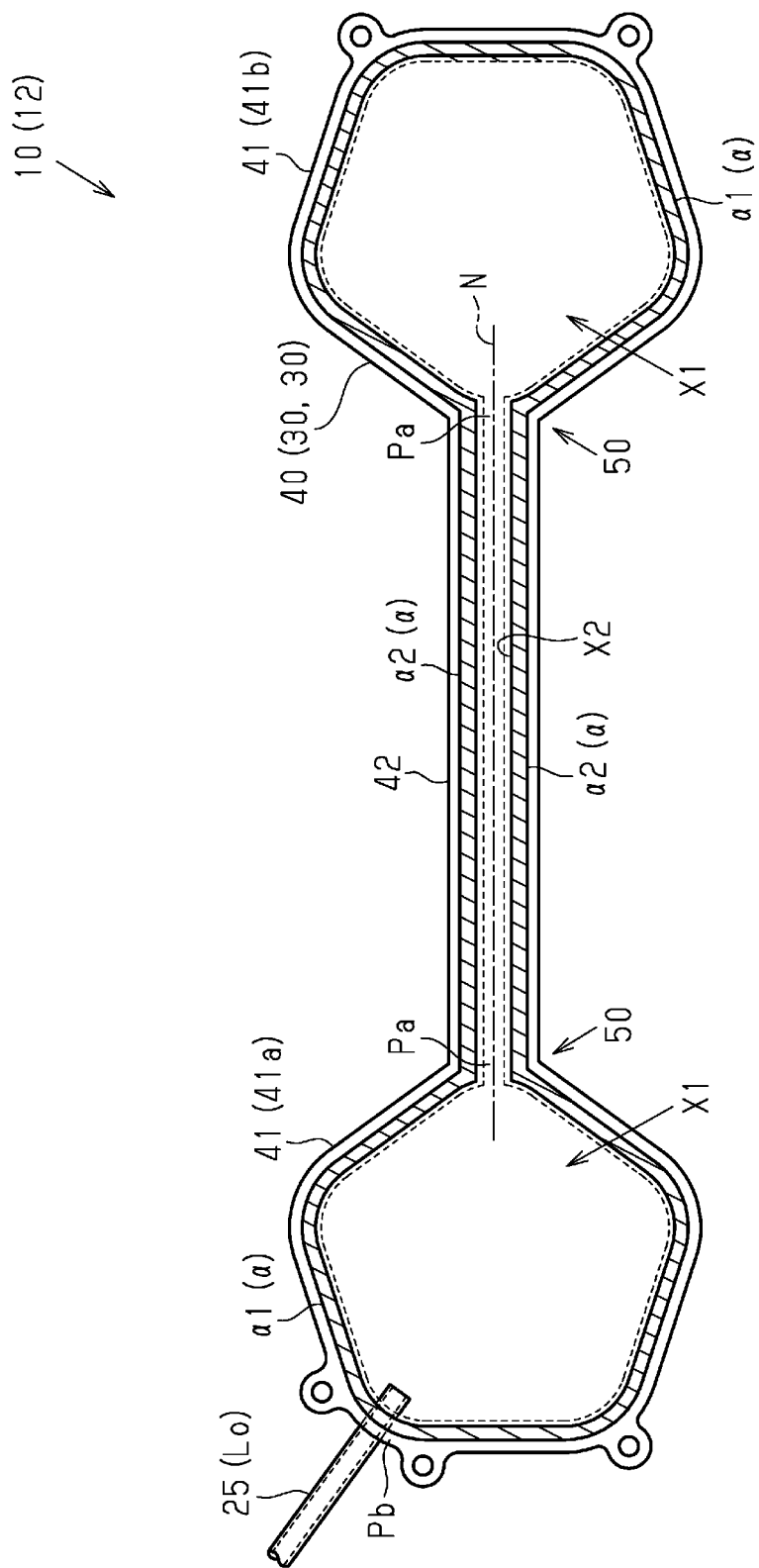
FIG. 5 is a plan view of the air bag.

Specifically, as illustrated in FIG. 5, in each of the air bags 10 according to the present embodiment, the bag portion 40 includes a pair of expansion portions 41, 41 each including an annular joining portion $\alpha$1 extending in an annular shape. Each of the air bags 10 according to the present embodiment includes, as the bag portion 40, a passage portion 42 which has a pair of parallel linear joining portions $\alpha$2, $\alpha$2 and is connected to each of the expansion portions 41, 41.

Specifically, each of the air bags 10 according to the present embodiment has a structure in which the two sheet members 30, 30 are overlapped in a thickness direction thereof. The two sheet members 30, 30 are punched in accordance with shapes of the expansion portions 41, 41 and the passage portion 42 which constitute the bag portion 40. In each of the air bags 10 according to the present embodiment, by welding the peripheral edge portion of each of the sheet members 30, 30 to each other, the annular joining portion $\alpha$1 of each of the expansion portions 41, 41 and each of the linear joining portions $\alpha$2, $\alpha$2 of the passage portion 42 are formed as a part of the joining portion $\alpha$ extending over entire periphery of the bag portion 40.

In each of the air bags 10 according to the present embodiment, a flexible resin material is used as a material of each of sheet members 30, 30. These sheet members 30, 30 are joined to each other by, for example, high-frequency welding or the like. In FIG. 5, positions where the joining portion $\alpha$ are formed are illustrated by hatching. In FIG. 5, a portion indicated by a broken line inside the joining portion $\alpha$ is an effective expansion range of the bag portion 40 in each of these air bags 10.

Further, in each of the air bags 10 according to the present embodiment, a passage X2 sandwiched between the pair of linear joining portions $\alpha$2, $\alpha$2 defining the passage portion 42 is opened to internal spaces X1, X1 of the expansion portions 41, 41 surrounded by the annular joining portions $\alpha$1. Accordingly, each of the air bags 10 according to the present embodiment is configured such that the air filled in the bag portion 40 flows through the internal spaces X1, X1 of the expansion portions 41, 41 and the passage X2 formed by the passage portion 42.

More specifically, in each of the air bags 10 according to the present embodiment, each of the expansion portions 41, 41 has a substantially pentagonal shape when viewed from the direction in which the sheet members 30, 30 are overlapped on each other. In addition, the passage portion 42 according to the present embodiment has a substantially linear outer shape. Further, each of end portions in a longitudinal direction of the passage portion 42 is connected to a vertex portion Pa of each of the expansion portions 41, 41 having the substantially pentagonal shape. In each of the air bags 10 according to the present embodiment, the expansion portions 41, 41 and the passage portion 42 have a substantially line-symmetric shape having an axis N of the passage portion 42 extending linearly as a symmetry axis.

Further, in each of the air bags 10 according to the present embodiment, the air tube 25 defining the air supply and exhaust passage Lo for the bag portion 40 is connected to an expansion portion 41$a$ which is one of the expansion portions 41, 41. Specifically, in each of the air bags 10 according to the present embodiment, the air tube 25 is connected to the expansion portion 41$a$ at a vertex portion Pb different from the vertex portion Pa to which the passage portion 42 is connected. That is, in each of the air bags 10 according to the present embodiment, the air supplied to the expansion portion 41$a$ via the air tube 25 flows into an expansion portion 41$b$ via the passage portion 42. Further, the air filled in the expansion portion 41$b$ also flows out to the expansion portion 41$a$ via the passage portion 42. Accordingly, each of the air bags 10 according to the present embodiment is configured such that the pair of expansion portions 41, 41 expand and contract by the air supply and exhaust via the air tube 25.

As illustrated in FIG. 1, in the seat device 20 according to the present embodiment, each of these air bags 10 is disposed on the inner side of the seat cover 1$x$ in a state in which the pair of expansion portions 41, 41 are separated from each other in a seat width direction. Accordingly, the seat device 20 according to the present embodiment is configured such that the expansion portions 41, 41 of each of the air bags 10 separated from each other on left and right sides thereof press a body of the occupant seated on the seat 1 in a well-balanced manner.

Further, in the seat device 20 according to the present embodiment, a length of the passage portion 42 of the air bag 12 for the seat cushion 2 is longer than a length of the passage portion 42 of the air bag 13 for the seat back 3. The passage portion 42 connects the expansion portions 41, 41 on the left and right sides thereof. Accordingly, the seat device 20 according to the present embodiment is configured to suitably press the buttocks and the thighs of both legs of the occupant seated on the seat 1.

In FIG. 5, as the air bag 10 of the seat device 20, the air bag 12 for the seat cushion 2 in which the length of the passage portion 42 connecting the expansion portions 41, 41 on the left and right sides thereof is long is illustrated. The air bag 13 for the seat back 3 has substantially the same configuration as that of the air bag 12 for the seat cushion 2, except that the length of the passage portion 42 is short. Therefore, the illustration thereof is omitted.

Figure 6:
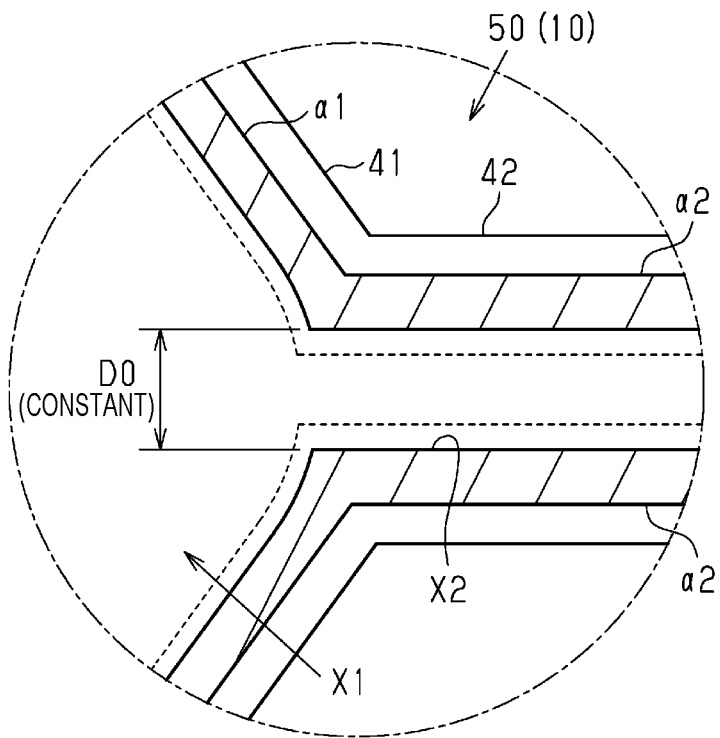
FIG. 6 is an enlarged view of a vicinity of a connection portion between an expansion portion and a passage portion.

More specifically, as illustrated in FIG. 6, each of the air bags 10 according to the present embodiment is configured such that the pair of linear joining portions α2, α2 extend in parallel at a connection portion 50 between each of the expansion portions 41, 41 and the passage portion 42. Specifically, in the passage portion 42 according to the present embodiment, a separation distance D0 between the pair of linear joining portions α2, α2 forming the passage X2 is constant at any position in the longitudinal direction. That is, in each of the air bags 10 according to the present embodiment, the pair of linear joining portions α2, α2 extend in parallel over the entire length of the passage portion 42. Accordingly, in each of the air bags 10 according to the present embodiment, a shape of a portion where the end portions in the longitudinal direction of the linear joining portions α2, α2 defining the passage portion 42 and the annular joining portion α1 defining each of the expansion portions 41, 41 intersect each other is a "pin angle" shape.

Next, operations of the present embodiment will be described.

Figure 7:
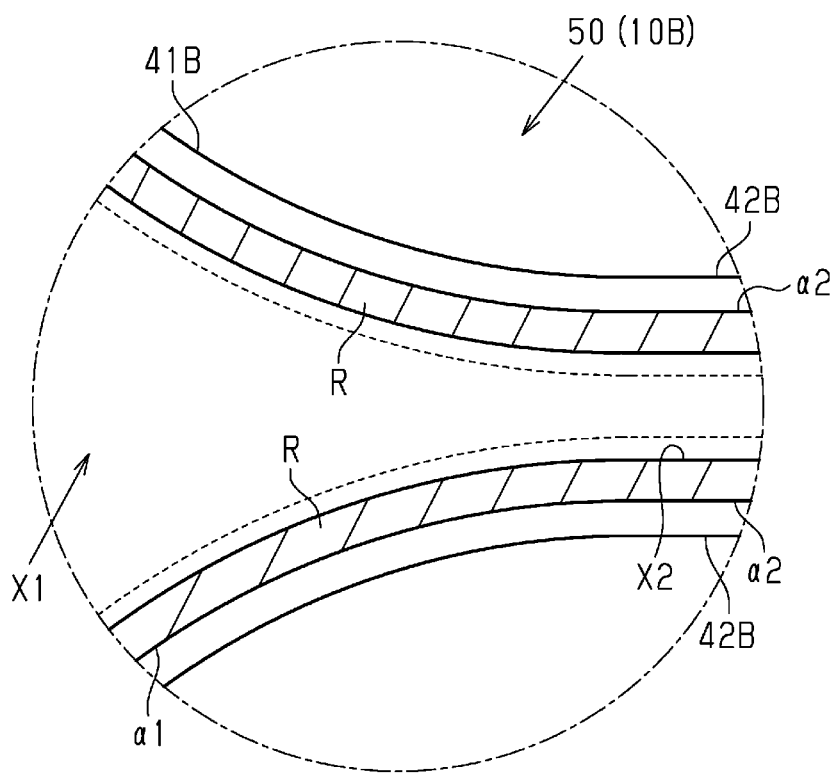
FIG. 7 is an enlarged view of a vicinity of a connection portion between an expansion portion and a passage portion in an air bag of a reference example.
Figure 8:
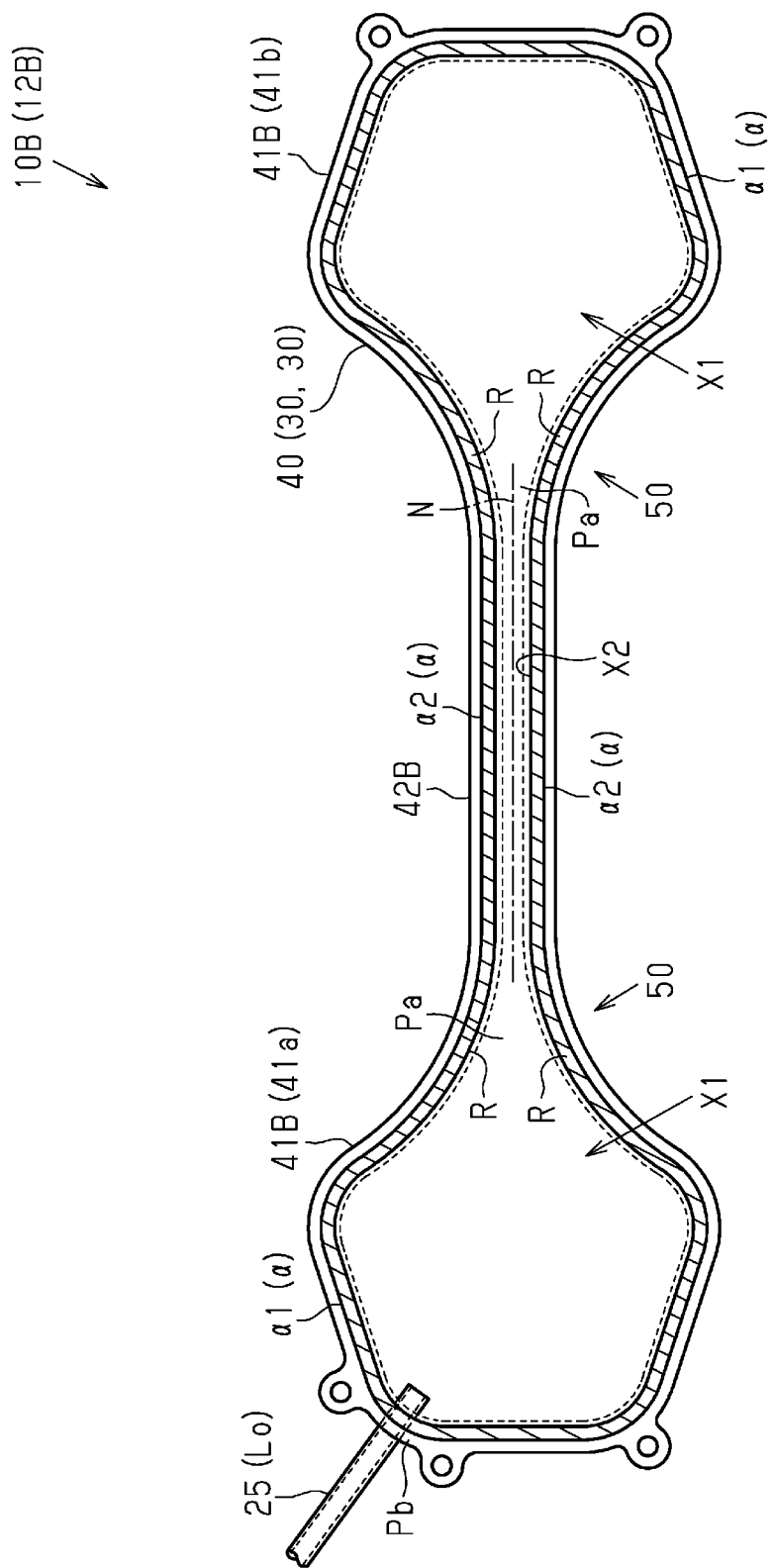
FIG. 8 is a plan view of the air bag of the reference example.

Similar to each of the air bags 10 according to the present embodiment, an air bag 10B of a reference example illustrated in FIGS. 7 and 8 includes, as the bag portion 40, a pair of expansion portions 41B, 41B each including the annular joining portion α1 extending in an annular shape, and a passage portion 42B including the pair of parallel linear joining portions α2, α2. The air bag 10B of the reference example also has a configuration in which the expansion portions 41B, 41B are connected to both ends in the longitudinal direction of the passage portion 42B that extends linearly.

In addition, the air bag 10B of the reference example has arc-shaped curved portions R at the end portions in the longitudinal direction of the linear joining portions α2, α2 defining the passage portion 42B. Specifically, in the air bag 10B of the reference example, at the connection portion 50 between each of the expansion portions 41B, 41B and the passage portion 42B, the end portions in the longitudinal direction of each of the linear joining portions α2, α2 are configured to extend so as to expand from a deep side of the passage X2 toward an outlet side (from a right side to a left side in FIG. 7). Accordingly, the air bag 10B of the reference example is configured such that each of the linear joining portions α2, α2 of the passage portion 42B is continuous with the annular joining portion α1 of each of the expansion portions 41B, 41B in a manner of drawing a "R shape".

Figure 9:
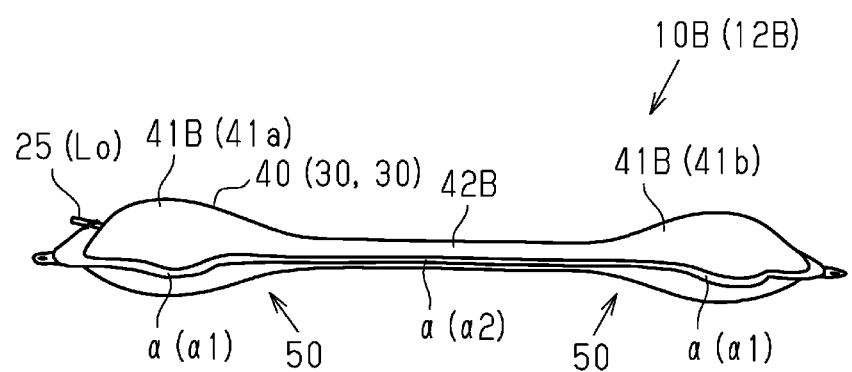
FIG. 9 is a perspective view of the air bag of the reference example filled with air.
Figure 10:
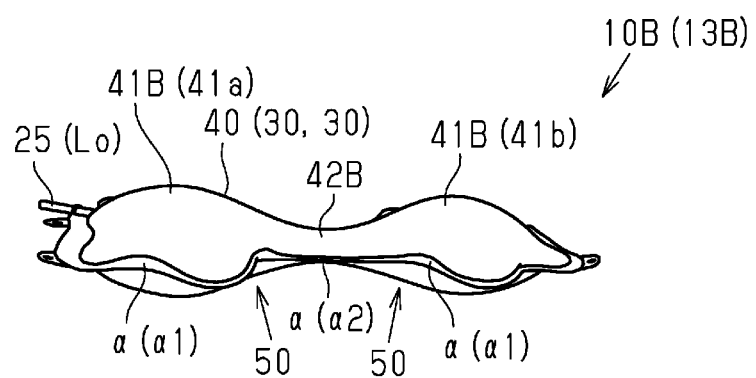
FIG. 10 is a perspective view of the air bag of the reference example filled with air.

As illustrated in FIG. 9 and FIG. 10, in the air bag 10B of the reference example, the connection portion 50 between each of the expansion portions 41B, 41B and the passage portion 42B is greatly expanded together with each of the expansion portions 41B, 41B when the air bag 10B is filled with air. As a result, in the air bag 10B of the reference example, the expanded shape of each of the expansion portions 41B, 41B deforms. Specifically, a boundary between each of the expansion portions 41B, 41B and the passage portion 42B is ambiguous. As a result, the air bag 10B of the reference example has a gently expanded shape as a whole. This tendency is common to the air bag 12B for the seat cushion 2 and the air bag 13B for the seat back 3 regardless of the length of the passage portion 42B.

Figure 11:
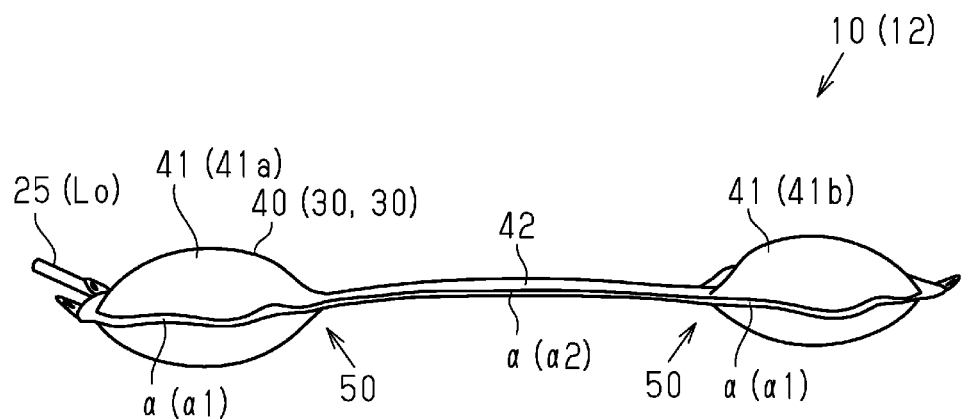
FIG. 11 is a perspective view of the air bag filled with air.
Figure 12:
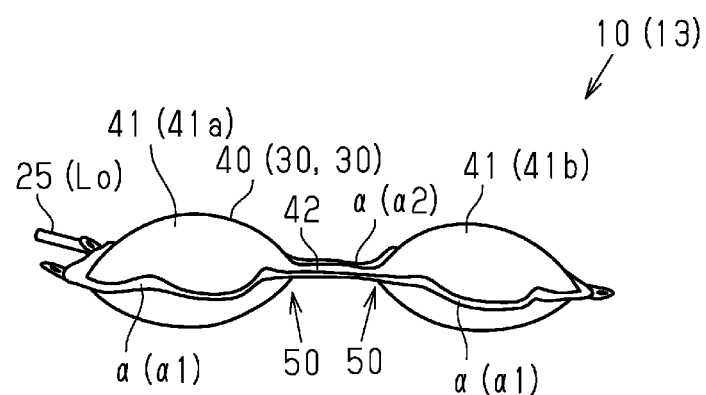
FIG. 12 is a perspective view of the air bag filled with air.

On the other hand, as illustrated in FIGS. 11 and 12, in the air bag 10 according to the present embodiment, the connection portion 50 between each of the expansion portions 41, 41 and the passage portion 42 is less likely to expand when the air bag 10 is filled with air. As a result, in the air bag 10 according to the present embodiment, the bag portion 40 expands in a state in which a boundary between each of the expansion portions 41, 41 and the passage portion 42 is maintained. This tendency is common to the air bag 12 for the seat cushion 2 and the air bag 13 for the seat back 3 regardless of the length of the passage portion 42.

Next, effects according to the present embodiment will be described.

(1) The air bag 10 includes the bag portion 40 formed by bonding the two sheet members 30, 30 together. Further, the bag portion 40 includes the expansion portion 41 including the annular joining portion α1 extending in an annular shape, and the passage portion 42 which has the pair of parallel linear joining portions α2, α2 and is connected to the expansion portion 41. Further, in the air bag 10, the air filled in the bag portion 40 flows through the internal space X1 of the expansion portion 41 surrounded by the annular joining portion α1, and through the passage X2 sandwiched between the pair of linear joining portions α2, α2 defining the passage portion 42. The air bag 10 is configured such that the pair of linear joining portions α2, α2 extend in parallel at the connection portion 50 between the expansion portion 41 and the passage portion 42.

According to the above configuration, the bag portion 40 can be expanded in a state in which a boundary between the expansion portion 41 and the passage portion 42 is maintained when the bag portion 40 is filled with air. Accordingly, a suitable expanded shape can be secured. Further, since deformation of the expanded shape is small, stress is less likely to be concentrated at a specific portion when the bag portion 40 is filled with air. Accordingly, the high reliability and durability can be ensured.

(2) The expansion portion 41 has a substantially pentagonal shape when viewed from the direction in which the sheet members 30, 30 are overlapped. The passage portion 42 is connected to the vertex portion Pa of each of the expansion portions 41, 41 having the substantially pentagonal shape.

According to the above configuration, the passage portion 42 connected to the expansion portion 41 is less likely to prevent expansion of the expansion portion 41. Accordingly, a suitable expanded shape can be secured.

(3) The expansion portion 41 and the passage portion 42 have a substantially line-symmetric shape having the axis N of the passage portion 42 extending linearly as a symmetry axis. Accordingly, the expansion portion 41 can be expanded in the well-balanced manner.

(4) In the air bag 10, the expansion portion 41 is a pair of expansion portions 41, 41 connected via the passage portion 42. Accordingly, a suitable expanded shape can be secured in which each of the pair of expansion portions 41, 41 arranged apart from each other expands in a state in which a boundary with the passage portion 42 is maintained.

(5) The seat device 20 includes the air bag 10 having the above configurations of (1) to (4) and disposed on an inner side of the seat cover 1x. Accordingly, an appropriate pressing force can be applied to the occupant seated on the seat 1 based on the suitable expanded shape of the air bag 10 provided on the inner side of the seat cover 1x.

(6) The seat device 20 provides a refresh function of pressing the seat cover 1x from the inner side by expanding and contracting the air bag 10.

According to the above configuration, an appropriate refreshing operation can be imparted to the occupant seated on the seat 1 based on the suitable expanded shape of the air bag 10. That is, the expansion portion 41 which expands in a state in which the boundary with the passage portion 42 is maintained presses the occupant seated on the seat 1 with pinpoint accuracy. As a result, an acupressure feeling can be reproduced suitably. Accordingly, a high refresh effect can be obtained.

The above embodiment can be modified and implemented as follows. The above embodiment and following modifications can be implemented in combination with each other within a technically consistent range.

Figure 13:
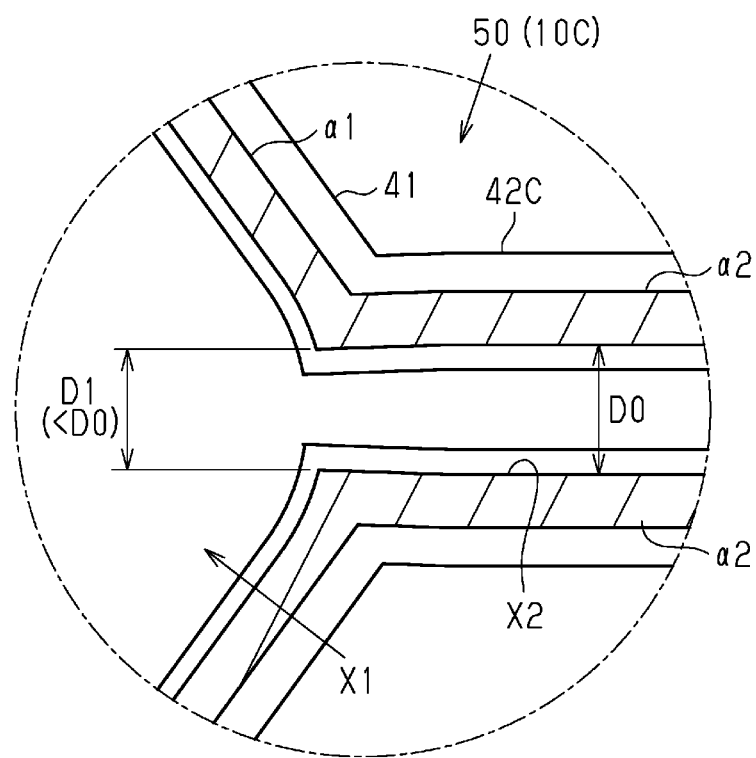
FIG. 13 is a plan view illustrating a shape of an air bag of another example.

In the above embodiment, the air bag 10 is configured such that the pair of linear joining portions α2, α2 extend in parallel at the connection portion 50 between the expansion portion 41 and the passage portion 42. However, this disclosure is not limited thereto, and as in an air bag 10C illustrated in FIG. 13, a configuration may be adopted in which the pair of linear joining portions α2, α2 extend so as to expand from an opening position of the passage X2 with respect to the internal space X1 of the expansion portion 41 toward the deep side of the passage X2 (from a left side to a right side in FIG. 7).

That is, in the air bag 10C, a separation distance D1 between the pair of linear joining portions α2, α2 set at the opening position of the passage X2 with respect to the internal space X1 of the expansion portion 41 is smaller than the separation distance D0 between the pair of linear joining portions α2, α2 set on the deep side of the passage X2 (D1<D0). When the passage portion 42C having such a configuration is adopted, the same effects as those of the above embodiment can also be obtained.

In the above embodiment, the shape of the expansion portion 41 when viewed from the direction in which the sheet members 30, 30 are overlapped, that is, the shape of the peripheral edge portion of the expansion portion 41 is substantially a pentagonal shape. However, this disclosure is not limited thereto, and the shape of the peripheral edge portion of the expansion portion 41 may be a polygonal shape other than the pentagonal shape. That is, the shape may be a triangular shape, a quadrangular shape, or a polygonal shape of a hexagon or more. The expansion portion 41 may have a circular shape at the peripheral edge portion thereof.

In the above embodiment, the passage portion 42 is connected to the vertex portion Pa of the expansion portion 41 having the polygonal shape, but the connection portion may not necessarily have to be connected to the vertex portion Pa of the polygon shape.

In the above embodiment, the air bag 10 includes, as the bag portion 40, the pair of expansion portions 41, 41 each having the annular joining portion α1 extending annularly, and the passage portion 42 which has the pair of parallel linear joining portions α2, α2 and is connected to each of the expansion portions 41, 41. However, this disclosure is not limited thereto, and may be applied to a configuration in which three or more expansion portions 41 are provided, and a pair of adjacent expansion portions 41, 41 are connected to each other via the passage portion 42. For example, this disclosure may be applied to a configuration in which only one expansion portion 41 is provided, such as a configuration in which the air tube 25 defining the air supply and exhaust passage Lo is connected to one end of the passage portion 42.

In the above embodiment, the expansion portion 41 and the passage portion 42 have a substantially line-symmetric shape having the axis N of the passage portion 42 extending linearly as the symmetry axis, but the expansion portion 41 and the passage portion 42 do not necessarily have to have such a line-symmetric shape. The shape of the passage portion 42 does not necessarily have to extend linearly.

A material and shape of each of the sheet members 30, 30 forming the air bag 10 and a bonding method thereof may be changed freely.

In the above embodiment, although this disclosure has been embodied in the air bag 10 used for refreshing, this disclosure may be applied to an air bag for a seat support that changes a support shape of the seat 1 by expanding and contracting on the inner side of the seat cover 1x. This disclosure may be applied to air bags used for applications other than the vehicle seat 1.

According to an aspect of this disclosure, an air bag includes a bag portion formed by bonding two sheet members together, the bag portion includes: an expansion portion which includes an annular joining portion extending in an annular shape, and a passage portion which includes a pair of parallel linear joining portions and is connected to the expansion portion, air filled in the bag portion flows through an internal space of the expansion portion surrounded by the annular joining portion and a passage sandwiched between the pair of linear joining portions defining the passage portion, and at a connection portion between the expansion portion and the passage portion, the pair of linear joining portions extend in parallel, or the pair of linear joining portions extend so as to expand toward a deep side of the passage from an opening position of the passage with respect to the internal space of the expansion portion.

According to the above configuration, the bag portion can be expanded in a state in which a boundary between the expansion portion and the passage portion is maintained when the bag portion is filled with air. Accordingly, a suitable expanded shape can be secured. Further, since deformation of the expanded shape is small, stress is less likely to be concentrated at a specific portion when the bag portion is filled with air. Accordingly, high reliability and durability can be ensured.

In the air bag according to the above aspect of this disclosure, it is preferable that the expansion portion has a polygonal shape when viewed from a direction in which the sheet members are overlapped, and the passage portion is connected to a vertex portion of the polygonal shape.

According to the above configuration, the passage portion connected to the expansion portion is less likely to prevent expansion of the expansion portion. Accordingly, a suitable expanded shape can be secured.

In the air bag according to the above aspect of this disclosure, it is preferable that the expansion portion and the passage portion have a line-symmetric shape having an axis of the passage portion extending linearly as a symmetry axis.

According to the above configuration, the expansion portion can be expanded in a well-balanced manner.

In the air bag according to the above aspect of this disclosure, it is preferable that the expansion portion is a pair of expansion portions connected via the passage portion.

According to the above configuration, a suitable expanded shape can be secured in which each of the pair of expansion portions arranged apart from each other expands in a state in which a boundary with the passage portion is maintained.

In a vehicle seat device according to an aspect of this disclosure, the air bag according to any one of the above aspects is disposed on an inner side of a seat cover of the vehicle seat device.

According to the above configuration, an appropriate pressing force can be applied to an occupant seated on a seat based on the suitable expanded shape of the air bag provided on the inner side of the seat cover.

In the vehicle seat device according to the above aspect of this disclosure, it is preferable that a refresh function of pressing the seat cover from the inner side by expanding and contracting the air bag is provided.

According to the above configuration, an appropriate refreshing operation can be imparted to the occupant seated on the seat based on the suitable expanded shape of the air bag. That is, the expansion portion that expands in a state in which the boundary with the passage portion is maintained presses the occupant seated on the seat with pinpoint accuracy. As a result, an acupressure feeling can be reproduced suitably. Accordingly, a high refresh effect can be obtained.

According to this disclosure, a suitable expanded shape can be secured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air bag comprising:
a bag portion formed by bonding two sheet members together, wherein
the bag portion includes:
an expansion portion which includes an annular joining portion extending in an annular shape, and
a passage portion which includes a pair of parallel linear joining portions and is connected to the expansion portion,
air filled in the bag portion flows through an internal space of the expansion portion surrounded by the annular joining portion and a passage sandwiched between the pair of linear joining portions defining the passage portion, and
at a connection portion between the expansion portion and the passage portion, the pair of linear joining portions extend in parallel, or the pair of linear joining portions extend so as to expand toward a deep side of the passage from an opening position of the passage with respect to the internal space of the expansion portion.

2. The air bag according to claim 1, wherein
the expansion portion has a polygonal shape when viewed from a direction in which the sheet members are overlapped, and the passage portion is connected to a vertex portion of the polygonal shape.

3. The air bag according to claim 1, wherein
the expansion portion and the passage portion have a line-symmetric shape having an axis of the passage portion extending linearly as a symmetry axis.

4. The air bag according to claim 1, wherein
the expansion portion is a pair of expansion portions connected via the passage portion.

5. A vehicle seat device, wherein
the air bag according to claim 1 is disposed on an inner side of a seat cover of the vehicle seat device.

6. The vehicle seat device according to claim 5, wherein
a refresh function of pressing the seat cover from the inner side by expanding and contracting the air bag is provided.

* * * * *